United States Patent
Blatterman

(10) Patent No.: US 10,536,062 B2
(45) Date of Patent: Jan. 14, 2020

(54) INDUCTION MOTOR WITH SERIES CONNECTED WINDINGS FOR MULTI-SPEED OPERATION

(71) Applicant: Regal Beloit America, Inc., Beloit, WI (US)

(72) Inventor: William Eugene Blatterman, Troy, OH (US)

(73) Assignee: Regal Beloit America, Inc., Beloit, WI (US)

(*) Notice: Subject to any disclaimer, the term of this patent is extended or adjusted under 35 U.S.C. 154(b) by 614 days.

(21) Appl. No.: 14/887,019

(22) Filed: Oct. 19, 2015

(65) Prior Publication Data

US 2017/0110942 A1    Apr. 20, 2017

(51) Int. Cl.
| | | |
|---|---|---|
| *H02K 17/08* | (2006.01) | |
| *H02K 17/30* | (2006.01) | |
| *H02K 3/28* | (2006.01) | |
| *H02P 25/083* | (2016.01) | |
| *H02K 11/28* | (2016.01) | |
| *H02P 25/04* | (2006.01) | |

(52) U.S. Cl.
CPC .............. *H02K 17/08* (2013.01); *H02K 3/28* (2013.01); *H02K 11/28* (2016.01); *H02K 17/30* (2013.01); *H02P 25/04* (2013.01); *H02P 25/083* (2013.01)

(58) Field of Classification Search
CPC .......... H02K 17/30; H02K 3/28; H02K 11/28; H02K 11/30; H02K 11/33; H02K 11/38; H02K 11/40; H02K 15/0056; H02K 15/0062; H02K 15/0068; H02K 17/06; H02K 17/08; H02P 25/083; H02P 25/04
USPC ....... 318/772, 773, 774, 775, 776, 777, 778, 318/779, 780, 790; 310/200, 189, 198
See application file for complete search history.

(56) References Cited

U.S. PATENT DOCUMENTS

| | | | | |
|---|---|---|---|---|
| 1,726,232 A | * | 8/1929 | Kennedy ................ | H02K 17/08 318/772 |
| 4,737,701 A | * | 4/1988 | Hoemann .............. | H02K 17/06 318/772 |
| 4,841,188 A | * | 6/1989 | Hao ........................ | H02K 17/08 310/189 |
| 4,937,513 A | | 6/1990 | Hoemann et al. | |
| 5,227,710 A | | 7/1993 | Lewus | |
| 6,713,986 B1 | | 3/2004 | Jayadev et al. | |
| 6,864,659 B2 | | 3/2005 | Ratz et al. | |

* cited by examiner

*Primary Examiner* — Mang Tin Bik Lian
*Assistant Examiner* — Alexander A Singh
(74) *Attorney, Agent, or Firm* — Armstrong Teasdale LLP

(57) ABSTRACT

An electric motor includes a main winding coupled to a first line terminal, and first and second boost windings coupled in series to the main winding. A high-speed lead wire is coupled to a first tap between the main winding and the first boost winding, a medium-speed lead wire is coupled to a second tap between the first boost winding and the second boost winding, and a low-speed lead wire is coupled to a third tap after the second boost winding. A start winding has a first end coupled to the first line terminal and a second end. A capacitor has a first end series-coupled to the second end of the start winding and a second end coupled to the second tap. A switch coupled to a second line terminal is configured to couple the second line terminal to one of the high, medium, and low-speed lead wires.

20 Claims, 3 Drawing Sheets

INDUCTION MOTOR WITH SERIES CONNECTED WINDINGS FOR MULTI-SPEED OPERATION

BACKGROUND

The embodiments described herein relate generally to electric motors, and more particularly, to an electric motor and methods of manufacture.

At least some known heating, ventilating and air-conditioning (HVAC) systems utilize multi-speed permanent split capacitor (PSC) motors. In general, a multi-tapped PSC motor is a motor that includes a multi-tapped main winding where all or part of a series-coupled main winding and one or more boost windings are coupled in parallel to a series-coupled start winding and capacitor. Such multi- speed PSC motors are used in HVAC applications, such as furnace blower and air handler applications, because the one or more boost windings may be energized to produce multiple levels of output torque and, therefore, multiple levels of output speed to deliver different amounts of air flow for different applications. For example, one tap setting may provide a relatively low amount of air flow for air circulation when there is no heating or cooling activity. Another tap setting could increase the air flow when cooling is desired. By using multiple taps, various operating states can be established for a PSC motor, such as heating, cooling, and air. In general, each tap point on the multi-tapped PSC motor is coupled to an input line and a switch is energized in response to control signals from, for example, a system controller to energize one of the tap points at any given time.

The maximum operating efficiency of a PSC motor is typically obtained by operating the motor at full load, so a reduced HVAC system load results in inefficient operation of the PSC motor. The HVAC system load may be reduced because of varying demand cycles due to a variety of factors such as, for example, daily and seasonal fluctuations of ambient temperature, human activity in the controlled environment, and intermittent operation of other equipment in the controlled environment. The start winding and capacitor are designed to optimize efficiency when operating in a high-speed operating mode such as a nominal AC line input frequency, e.g., 60 Hz. As a result, operation of the PSC motor at other than the nominal frequency results in production of less than optimal torque and inefficient operation. Moreover, efficiency standards are becoming stricter for medium-speed operating modes, which are sometimes used as much or more than high and low-speed operating modes.

BRIEF DESCRIPTION

In one aspect, an electric motor is provided that includes a main winding coupled to a first line terminal, and first and second boost windings coupled in series to the main winding. A high-speed lead wire is coupled to a first tap between the main winding and the first boost winding, a medium-speed lead wire is coupled to a second tap between the first boost winding and the second boost winding, and a low-speed lead wire is coupled to a third tap after the second boost winding. A start winding has a first end coupled to the first line terminal and a second end. A capacitor has a first end series-coupled to the second end of the start winding and a second end coupled to the second tap. A switch coupled to a second line terminal is configured to couple the second line terminal to one of the high, medium, and low-speed lead wires.

In another aspect, a method of manufacturing an electric motor is provided. The method includes coupling a main winding to a first line terminal, coupling a first boost winding in series to the main winding, and coupling a second boost winding in series to the first boost winding. The method also includes coupling a high-speed lead wire to a first tap provided between the main winding and the first boost winding, coupling a medium-speed lead wire to a second tap provided between the first boost winding and the second boost winding, and coupling a low-speed lead wire to a third tap provided after the second boost winding. The method further includes providing a start winding having a first end coupled to the first line terminal and a second end, providing a capacitor having a first end series-coupled to the second end of the start winding and a second end coupled to the second tap, and coupling a switch to a second line terminal The switch is configured to couple the second line terminal to one of the high-speed lead wire, the medium-speed lead wire, and the low-speed lead wire.

DETAILED DESCRIPTION

Figure 1:
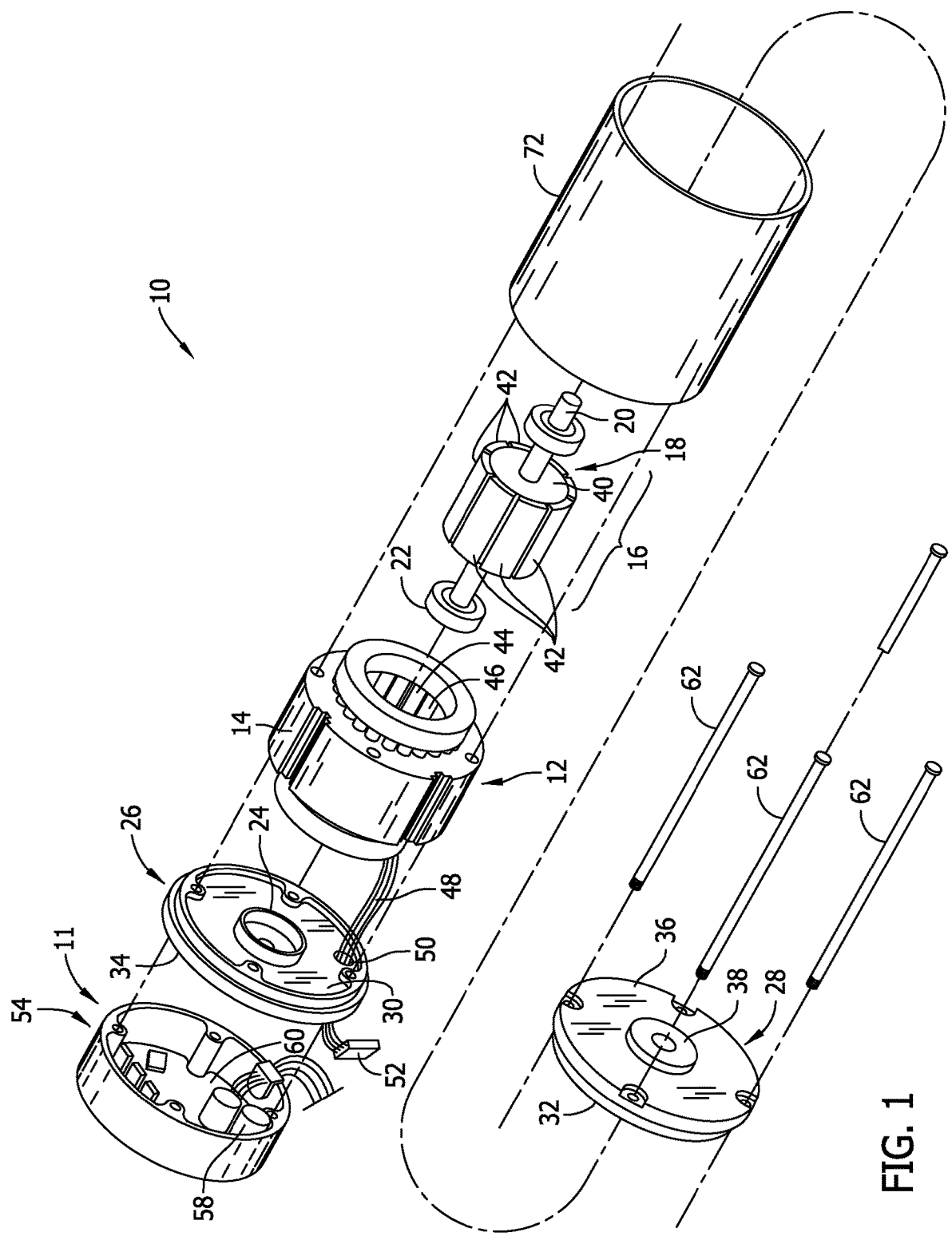
FIG. 1 is an exploded view of an exemplary motor.

FIG. 1 is an exploded view of an exemplary electric motor 10. In the exemplary embodiment, motor 10 is an induction motor such as a permanent split capacitor (PSC) induction motor. Motor 10 includes a stationary assembly 12 including a stator or core 14 and a rotatable assembly 16 including a permanent magnet rotor 18 and a shaft 20. A fan (not shown) or other device to be driven engages shaft 20. For example, one embodiment of motor 10 may be coupled to a fan for blowing air over cooling coils and/or a heat exchanger assembly and would be referred to as a blower motor. Another embodiment of motor 10, smaller in size and air moving capacity might be utilized as a draft inducing motor.

Rotor 18 is mounted on and keyed to shaft 20 for rotation within conventional bearings 22. Bearings 22 are mounted in bearing supports 24 integral with a first end member 26 and a second end member 28. First end member 26 has an inner facing side 30 and an outer side 34. Second end member 28 has an inner facing side 32 and an outer side 36. Outer sides 34 and 36 are opposite inner sides 30 and 32 respectively. Stationary assembly 12 and rotatable assembly 16 are located between sides 30 and 32. Additionally, second end member 28 includes an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number and construction, and flux fields may be utilized with such other rotors within the scope of the invention.

Stationary assembly 12 comprises a plurality of windings 44 adapted to be electrically energized to generate an electromagnetic field. Windings 44 are coils of wire wound around teeth 46 of laminated stator core 14. Winding terminal leads 48 are brought out through an aperture 50 in first end member 26 terminating in a connector 52. While stationary assembly 12 is illustrated for purposes of disclosure, it is contemplated that other stationary assemblies of various other constructions having different shapes and with different number of teeth may be utilized within the scope of the invention.

Motor 10 may include any even number of rotor poles and the number of stator poles are a multiple of the number of rotor poles. For example, the number of stator poles may be based on the number of phases.

Motor 10 further includes an enclosure 54 which mounts on the rear portion of motor 10. A control system 11 includes a plurality of electronic components 58 and a connector (not shown) mounted on a component board 60, such as a printed circuit board. Control system 11 is connected to winding stages 44 by interconnecting connector 52. Control system 11 applies a voltage to one or more of winding stages 44 at a time for commutating windings 44 in a preselected sequence to rotate rotatable assembly 16 about an axis of rotation.

A housing 72 is positioned between first end member 26 and second end member 28 to facilitate enclosing and protecting stationary assembly 12 and rotatable assembly 16.

Although described as being a PSC induction motor, motor 10 may include any suitable type of electric motor including, but not limited to, induction motor 12, a brushless direct current (BLDC) motor, an electronically commutated motor (ECM), a brushless alternating current (BLAC) motor, or a stepper motor.

Figure 2:
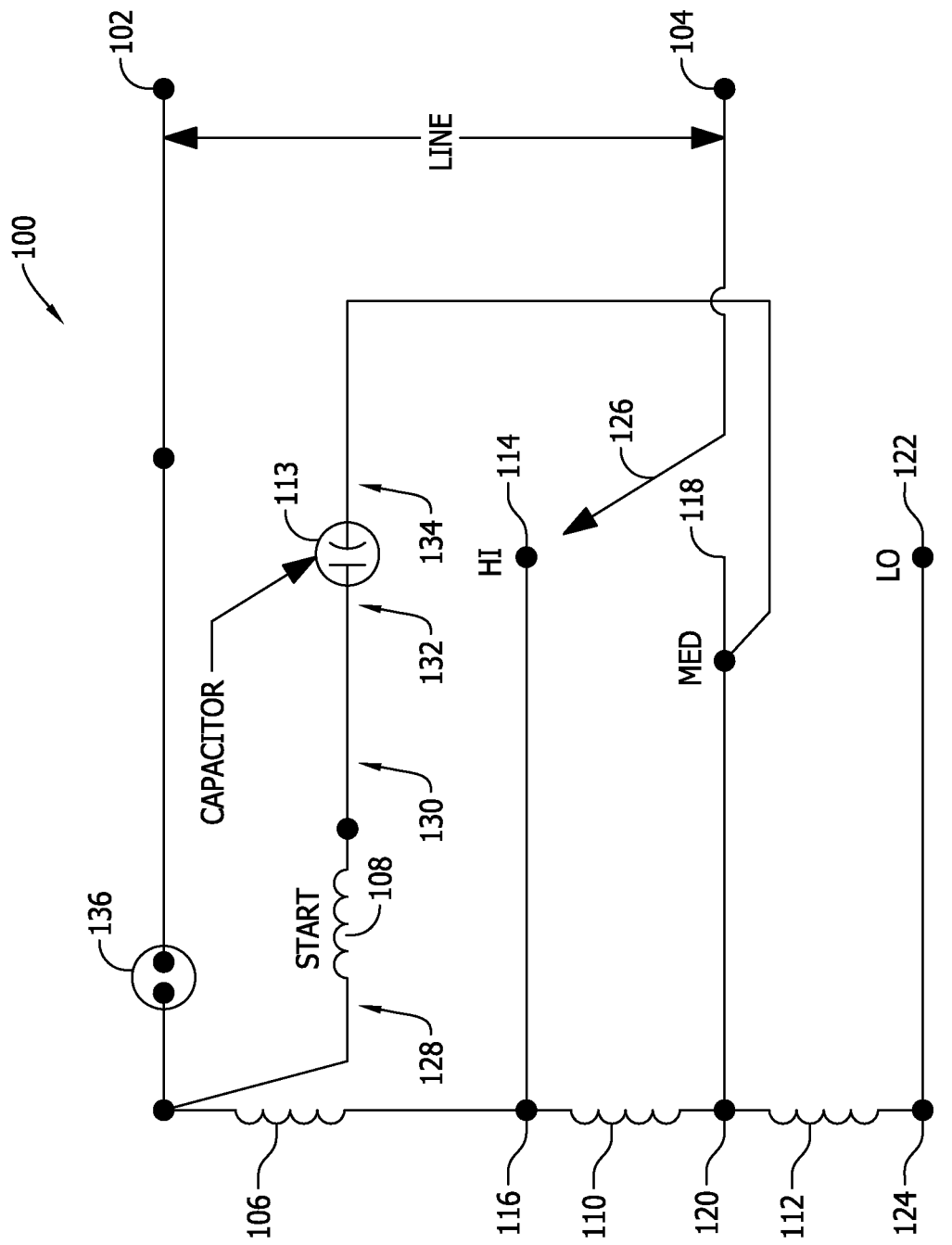
FIG. 2 is a schematic diagram of an exemplary motor controller for use with the motor shown in FIG. 1.

FIG. 2 is a circuit diagram of an exemplary PSC motor 100, such as motor 10 (shown in FIG. 1). In the exemplary embodiment, PSC motor 100 is a 3-speed, single-phase motor. Motor 100 includes a first line terminal 102 and a second line terminal 104 for connection to an external alternating current (AC) power source, a first or main winding 106, a second or start winding 108, a first boost winding 110, a second boost winding 112, and a capacitor 113.

Main winding 106 is coupled to first line terminal 102. First boost winding 110 is coupled in series to main winding 106, and second boost winding 112 is coupled in series to first boost winding 110. A first or high-speed lead wire 114 is coupled to a first tap 116 provided between main winding 106 and first boost winding 110. A second or medium-speed lead wire 118 is coupled to a second tap 120 provided between first boost winding 110 and second boost winding 112. A third or low-speed lead wire 122 is coupled to a third tap 124 provided after second boost winding 112.

A multiple position speed selection switch 126 is coupled to second line terminal 104. A system controller (not shown) controls a position of switch 126 based on a desired operating speed of motor 100. In the exemplary embodiment, motor 100 has three operating speeds: high speed, medium speed, and low speed. Switch 126 is configured to couple second line terminal 104 to one of high-speed lead wire 114, medium-speed lead wire 118, or low-speed lead wire 122. High-speed lead wire 114 is coupled to first tap 116, medium-speed lead wire 118 is coupled to second tap 120, and low-speed lead wire 122 is coupled to third tap 124.

In the exemplary embodiment, start winding 108 includes a first end 128 coupled to first line terminal 102 and a second end 130 coupled to a first end 132 of capacitor 113. Capacitor 113 includes a second end 134 coupled to second tap 120, such that capacitor 113 is series-coupled to start winding 108. Accordingly, start winding 108 and series-coupled capacitor 113 are coupled in parallel to the medium-speed connection of motor 100, which includes main winding 106 and series-coupled first boost winding 110.

In the exemplary embodiment, motor 100 may be operated at three different speeds. However, in other embodiments, motor 100 may be operated at any number of speeds that enable motor 100 to function as described herein. The specific speed ranges for high, medium, and low speed operations are specified by a customer. Based on the specified speed ranges, a number of turns in each of main winding 106 and first and second boost windings 110 and 112 is designed to produce corresponding torque outputs under the high, medium, and low speed connections. For example, first tap 116 may be associated with heating activity, second tap 120 may be associated with cooling activity, and third tap 124 may be associated with continuous fan activity. However, in alternative embodiments, the different speeds of operation may be associated with any of the taps.

During high-speed operation of motor 100, when the system controller operates switch 126 to couple second line terminal 104 to first tap 116, first boost winding 110 is coupled in series to start winding 108. As a result, series-coupled start winding 108, capacitor 113, and first boost winding 110 are coupled in parallel to main winding 106. The full AC line voltage (i.e., 120 V) is induced across both main winding 106 and series-coupled start winding 108, capacitor 113, and first boost winding 110, enabling operation of motor 100 at its highest speed.

During medium-speed operation of motor 100, when the system controller operates switch 126 to couple second line terminal 104 to second tap 120, first boost winding 110 is coupled in series with main winding 106. As a result, series-coupled first boost winding 110 and main winding 106 are coupled in parallel to series-coupled start winding 108 and capacitor 113. First boost winding 110 is configured to reduce the voltage induced on main winding 106, which causes torque produced by motor 100 to decrease, resulting in a slower motor operating speed as compared to the high-speed mode of operation. The configuration of motor 100 for medium-speed operation optimizes capacitor 113 and start winding 108 for medium-speed operation to improve overall motor efficiency.

During low-speed operation of motor 100, when the system controller operates switch 126 to couple second line terminal 104 to third tap 124, first and second boost windings 110 and 112 are coupled in series with main winding 106. As a result, series-coupled main winding 106 and first and second boost windings 110 and 112 are coupled in parallel to series-coupled start winding 108 and capacitor 113. First and second boost windings 110 and 112 are configured to reduce the voltage induced on main winding 106 even more as compared to the medium-speed mode of operation. The reduction of voltage causes torque produced by motor 100 to decrease, enabling operation of motor 100 at low speed.

In some embodiments, a thermal protective device 136 is coupled to first line terminal 102 before the coupling point of main and start windings 110 and 112. In the event of a failure of one capacitor 113 during medium-speed operation, full line voltage may be applied directly across main winding 106, which could result in resistance heating of main winding 106 and lead to rapid damage or failure of the motor windings. Thermal protective device 136 is configured to prevent this type of event from occurring.

Figure 3:
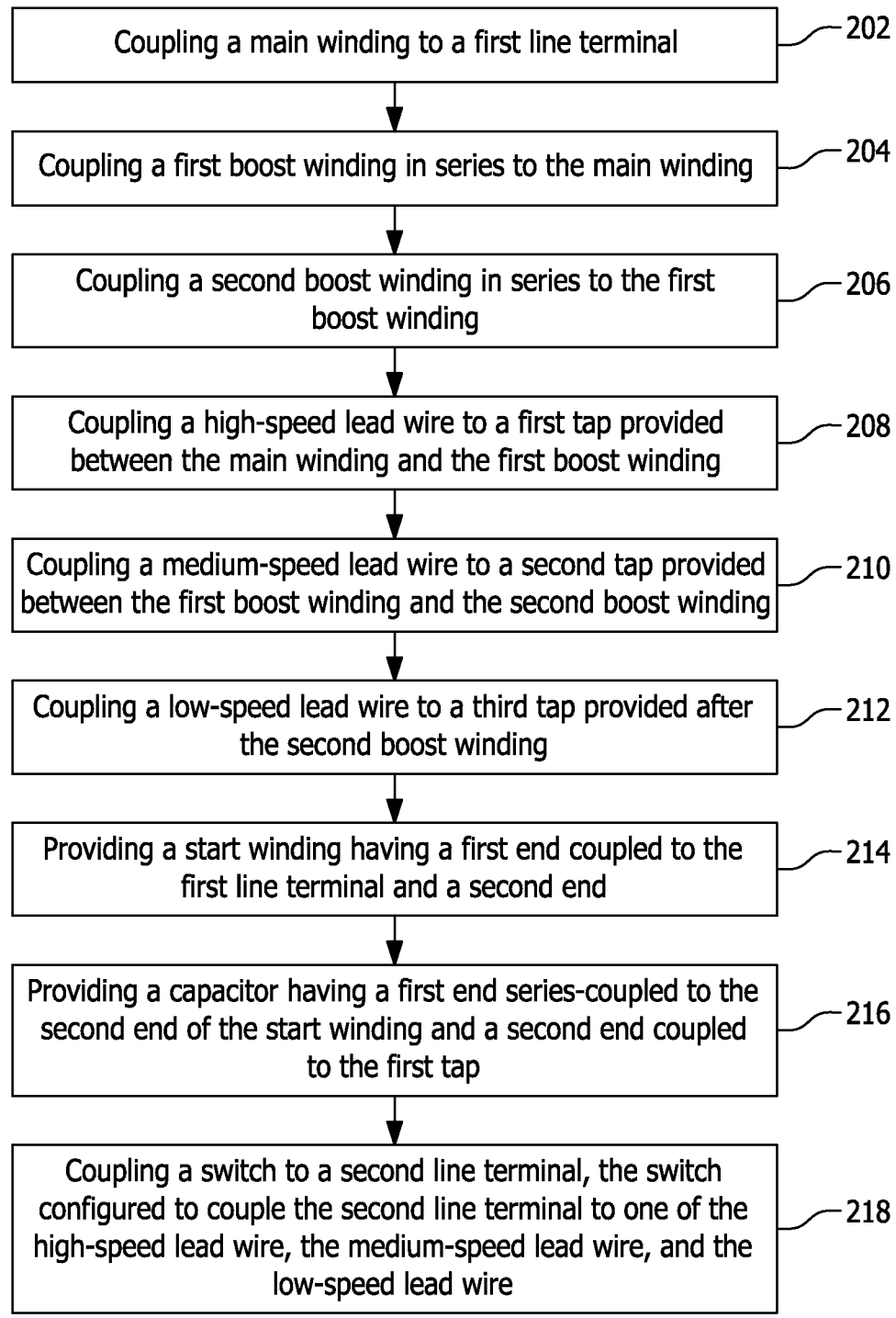
FIG. 3 is a flowchart of an exemplary method of manufacturing the electric motor shown in FIG. 2.

FIG. 3 is a flowchart of an exemplary method 200 of manufacturing the electric motor shown in FIG. 2. In the exemplary embodiment, method 200 includes coupling 202 a main winding to a first line terminal A first boost winding is coupled 204 in series to the main winding. Method 200 also includes coupling 206 a second boost winding in series to the first boost winding.

Method further includes coupling 208 a high-speed lead wire to a first tap provided between the main winding and the first boost winding, coupling 210 a medium-speed lead wire to a second tap provided between the first boost winding and the second boost winding, and coupling 212 a low-speed lead wire to a third tap provided after the second boost winding.

A start winding is provided 214 having a first end coupled to the first line terminal and a second end. A capacitor is provided 216 having a first end series-coupled to the second end of the start winding and a second end coupled to the first tap.

Additionally, method 200 includes coupling 218 a switch to a second line terminal, the switch configured to couple the second line terminal to one of the high-speed lead wire, the medium-speed lead wire, and the low-speed lead wire.

The embodiments described herein provide electric motor and methods of manufacture. The embodiments facilitate optimizing performance of a PSC induction motor for medium speed operation. More specifically, the PSC motor described herein is configured to optimize a capacitor and start winding for medium speed operation to improve motor efficiency without losing significant efficiency at other operating speeds. The improvement in efficiency at medium speed operation reduces cost of operation and increases lifetime of the system.

Exemplary embodiments of the electric motor and methods of manufacture are described above in detail. The electric motor and methods of manufacture are not limited to the specific embodiments described herein, but rather, components of the control system and/or the motor and/or steps of the method may be utilized independently and separately from other components and/or steps described herein. For example, the electric motor and methods of manufacture may also be used in combination with other power systems and methods, and are not limited to practice with only the HVAC system as described herein. Rather, the exemplary embodiments can be implemented and utilized in connection with many other system applications or other support.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric motor comprising:
   a main winding coupled to a first line terminal;
   a first boost winding coupled in series to said main winding;
   a second boost winding coupled in series to said first boost winding;
   a high-speed lead wire coupled to a first tap provided between said main winding and said first boost winding;
   a medium-speed lead wire coupled to a second tap provided between said first boost winding and said second boost winding;
   a low-speed lead wire coupled to a third tap provided after said second boost winding;
   a start winding comprising a first end coupled to said first line terminal and a second end;
   a switch coupled to a second line terminal and configured to selectively couple said second line terminal to each of said high-speed lead wire, said medium-speed lead wire, and said low-speed lead wire; and
   a capacitor comprising a first end series-coupled to said second end of said start winding and a second end coupled to said second tap, such that said capacitor and said start winding are coupled in parallel with said main winding and in series with said first boost winding when said switch is coupled to said high-speed lead wire, in parallel with said main winding and said first boost winding when said switch is coupled to said medium-speed lead wire or said low-speed lead wire, and not in parallel with said second boost winding when said switch is coupled to said low-speed lead wire.

2. The electric motor of claim 1, wherein said start winding is coupled in parallel with said main winding for each of a high-speed, a medium-speed, and a low-speed operation of said motor.

3. The electric motor of claim 1, wherein during high-speed operation of said motor, said switch couples said second line terminal to said first tap.

4. The electric motor of claim 3, wherein during high-speed operation, said first boost winding is coupled in series to said start winding and said capacitor.

5. The electric motor of claim 4, wherein during high-speed operation, said series-coupled start winding, capacitor, and first boost winding are coupled in parallel with respect to the first line terminal and the second line terminal.

6. The electric motor of claim 5, wherein during high-speed operation, substantially full AC line voltage is induced, via the first line terminal and the second line terminal, across both said main winding and said series-coupled start winding, capacitor, and first boost winding, to enable high-speed operation of said motor.

7. The electric motor of claim 1, wherein during medium-speed operation of said motor, said switch couples said second line terminal to said second tap.

8. The electric motor of claim 7, wherein during medium-speed operation, said first boost winding is coupled in series to said main winding.

9. The electric motor of claim 8, wherein during medium-speed operation, said series-coupled first boost winding and main winding are coupled in parallel with respect to the first line terminal and the second line terminal.

10. The electric motor of claim 9, wherein during medium-speed operation, said first boost winding is configured to reduce voltage induced on said main winding, which causes torque produced by said motor to decrease, resulting in a medium-speed mode of operation.

11. The electric motor of claim 1, wherein during low-speed operation of said motor, said switch couples said second line terminal to said third tap.

12. The electric motor of claim 11, wherein during low-speed operation, said first and second boost windings are coupled in series with said main winding.

13. The electric motor of claim 12, wherein said series-coupled main winding, first boost winding, and second boost winding are coupled in parallel with respect to the first line terminal and the second line terminal.

14. The electric motor of claim 13, wherein during low-speed operation, said first and second boost windings are configured to reduce voltage induced on said main winding to enable operation of said motor at low speed.

15. The electric motor of claim 1, wherein said electric motor is a permanent split capacitor (PSC) induction motor.

16. A method of manufacturing an electric motor comprising:
- coupling a main winding to a first line terminal;
- coupling a first boost winding in series to the main winding;
- coupling a second boost winding in series to the first boost winding;
- coupling a high-speed lead wire to a first tap provided between the main winding and the first boost winding;
- coupling a medium-speed lead wire to a second tap provided between the first boost winding and the second boost winding;
- coupling a low-speed lead wire to a third tap provided after the second boost winding;
- providing a start winding having a first end coupled to the first line terminal and a second end;
- coupling a switch to a second line terminal, the switch configured to selectively couple the second line terminal to each of the high-speed lead wire, the medium-speed lead wire, and the low-speed lead wire; and
- providing a capacitor having a first end series-coupled to the second end of the start winding and a second end coupled to the second tap, such that said capacitor and said start winding are coupled in parallel with the main winding and in series with the first boost winding when the switch is coupled to the high-speed lead wire, in parallel with the main winding and the first boost winding when the switch is coupled to the medium-speed lead wire or the low-speed lead wire, and not in parallel with the second boost winding when the switch is coupled to the low-speed lead wire.

17. The method of claim 16, further comprising coupling the start winding in parallel with the main winding for each of a high-speed, a medium-speed, and a low-speed operation of the motor.

18. The method of claim 16, wherein during high-speed operation of the motor, said method further comprises:
- coupling the second line terminal to the first tap;
- coupling the first boost winding in series to the start winding and the capacitor; and
- coupling the series-coupled start winding, capacitor, and first boost winding in parallel with respect to the first line terminal and the second line terminal.

19. The method of claim 16, wherein during medium-speed operation of the motor, said method further comprises:
- coupling the second line terminal to the second tap;
- coupling the first boost winding in series to the main winding; and
- coupling the series-coupled first boost winding and main winding in parallel with respect to the first line terminal and the second line terminal.

20. The method of claim 16, wherein during low-speed operation of the motor, said method further comprises:
- coupling the second line terminal to the third tap;
- coupling the first and second boost windings in series with the main winding; and
- coupling the series-coupled main winding, first boost winding, and second boost winding in parallel with respect to the first line terminal and the second line terminal.

* * * * *